United States Patent
Wei

(10) Patent No.: US 9,210,530 B2
(45) Date of Patent: Dec. 8, 2015

(54) CONFIGURING APPLICATION PARAMETER OF MOBILE TERMINAL

(71) Applicant: Huawei Device Co.,Ltd., Shenzhen, Guangdong (CN)

(72) Inventor: Qiuyang Wei, Beijing (CN)

(73) Assignee: HUAWEI DEVICE CO., LTD., Shenzhen (CN)

(*) Notice: Subject to any disclaimer, the term of this patent is extended or adjusted under 35 U.S.C. 154(b) by 68 days.

(21) Appl. No.: 14/141,443

(22) Filed: Dec. 27, 2013

(65) Prior Publication Data

US 2014/0106733 A1  Apr. 17, 2014

Related U.S. Application Data

(63) Continuation of application No. PCT/CN2012/080591, filed on Aug. 25, 2012.

(30) Foreign Application Priority Data

Aug. 25, 2011 (CN) .......................... 2011 1 0246506

(51) Int. Cl.
  *H04B 7/00* (2006.01)
  *H04W 4/00* (2009.01)
  (Continued)

(52) U.S. Cl.
  CPC ............. *H04W 4/001* (2013.01); *H04B 5/0031* (2013.01); *H04B 5/02* (2013.01); *H04L 41/0806* (2013.01);
  (Continued)

(58) Field of Classification Search
  CPC .... H04B 5/0031; H04B 5/02; H04L 41/0806; H04L 41/0886; H04L 67/34; H04M 1/72552; H04M 1/72569; H04M 1/72572; H04M 2250/04; H04W 4/001; H04W 4/008; H04W 84/18; H04W 8/005; H04W 8/24
  USPC ......... 455/41.1, 41.2, 435.1, 435.2, 420, 419, 455/456.1, 552.1, 422.1; 370/328, 331, 370/338; 340/572.1, 572.2
  See application file for complete search history.

(56) References Cited

U.S. PATENT DOCUMENTS

2004/0046871 A1  3/2004  Ichikawa et al.
2006/0099911 A1  5/2006  Shibuya
  (Continued)

FOREIGN PATENT DOCUMENTS

CN  1662920 A  8/2005
CN  1774090 A  5/2006
  (Continued)

OTHER PUBLICATIONS

"Wi-Fi protected setup specification" version 1.0h, XP55031152, Dec. 2006, total 110 pages.
  (Continued)

*Primary Examiner* — Babar Sarwar
(74) *Attorney, Agent, or Firm* — Huawei Device Co., Ltd.

(57) ABSTRACT

Embodiments of the present application disclose a method, related apparatus, and system for configuring an application parameter of a mobile terminal, so as to configure an application parameter of a mobile terminal conveniently. The method includes: establishing, by the mobile terminal, a near field communication (NFC) connection with a configurator; negotiating, between the mobile terminal and the configurator, a type of an application parameter to be configured and a manner for receiving the application parameter through the NFC connection; receiving, by the mobile terminal, the application parameter from the configurator according to the negotiated manner; and performing, by the mobile terminal, an application parameter configuration for the mobile terminal according to the received application parameter.

13 Claims, 6 Drawing Sheets

(51) Int. Cl.
*H04W 8/24* (2009.01)
*H04B 5/02* (2006.01)
*H04B 5/00* (2006.01)
*H04L 12/24* (2006.01)
*H04W 84/18* (2009.01)
*H04W 8/00* (2009.01)
*H04L 29/08* (2006.01)
*H04M 1/725* (2006.01)

(52) U.S. Cl.
CPC ............ *H04W 8/24* (2013.01); *H04L 41/0886* (2013.01); *H04L 67/34* (2013.01); *H04M 1/72552* (2013.01); *H04M 1/72569* (2013.01); *H04M 1/72572* (2013.01); *H04M 2250/04* (2013.01); *H04W 4/008* (2013.01); *H04W 8/005* (2013.01); *H04W 84/18* (2013.01)

(56) References Cited

U.S. PATENT DOCUMENTS

| | | |
|---|---|---|
| 2006/0278702 A1 | 12/2006 | Sakai |
| 2007/0001853 A1 | 1/2007 | Otranen |
| 2007/0026861 A1 | 2/2007 | Kuhn et al. |
| 2007/0115816 A1 | 5/2007 | Sinivaara |
| 2007/0178935 A1 | 8/2007 | Shim et al. |
| 2007/0192082 A1 | 8/2007 | Gaos et al. |
| 2007/0263596 A1 | 11/2007 | Charrat |
| 2008/0003995 A1 | 1/2008 | Itayahisanori |
| 2008/0117847 A1 | 5/2008 | Hamada |
| 2009/0111378 A1* | 4/2009 | Sheynman et al. .......... 455/41.1 |
| 2009/0144435 A1 | 6/2009 | Naniyatarun |
| 2009/0247077 A1 | 10/2009 | Sklovsky et al. |
| 2010/0034120 A1 | 2/2010 | Nakajima |
| 2010/0097173 A1 | 4/2010 | Ishige et al. |
| 2011/0022755 A1 | 1/2011 | Sueyoshi et al. |
| 2011/0029777 A1 | 2/2011 | Murakami et al. |
| 2015/0024730 A1 | 1/2015 | Wakasa et al. |

FOREIGN PATENT DOCUMENTS

| | | |
|---|---|---|
| CN | 1910832 A | 2/2007 |
| CN | 101233699 A | 7/2008 |
| CN | 201146522 Y | 11/2008 |
| CN | 101335951 A | 12/2008 |
| CN | 101843124 A | 9/2010 |
| CN | 101953091 A | 1/2011 |
| CN | 102047223 A | 5/2011 |
| CN | 102291493 A | 12/2011 |
| EP | 2196040 B1 | 1/2012 |
| JP | 2000268215 A | 9/2000 |
| JP | 2002252876 A | 9/2002 |
| JP | 2004023692 A | 1/2004 |
| JP | 2005012354 A | 1/2005 |
| JP | 2006245929 A | 9/2006 |
| JP | 2006345451 A | 12/2006 |
| JP | 2007043688 A | 2/2007 |
| JP | 2007066042 A | 3/2007 |
| JP | 2007266864 A | 10/2007 |
| JP | 2008027179 A | 2/2008 |
| JP | 2008131175 A | 6/2008 |
| JP | 2008136121 A | 6/2008 |
| JP | 2009130856 A | 6/2009 |
| JP | 2010041666 A | 2/2010 |
| JP | 2010086025 A | 4/2010 |
| JP | 2010102410 A | 5/2010 |
| JP | 2011518362 A | 6/2011 |
| KR | 20080098410 A | 11/2008 |
| WO | 2004003801 A1 | 1/2004 |
| WO | 2006098035 A1 | 9/2006 |
| WO | 2007001629 A2 | 1/2007 |
| WO | 2008048376 A1 | 4/2008 |

OTHER PUBLICATIONS

Bill Burke: "Restful System Architecture Based on JAVA", First Version, Aug. 23, 2010, total 27 pages.
K. Tagawa: "Technology Creating Business, Mobile • Hardware, 5th, NFC", Jun. 1, 2009, total 12 pages.
M. Wakame et al: "Samples and Techniques for Using Android 2.3 Only Hacks Gingerbread", Jun. 6, 2011, total 9 pages.

* cited by examiner

CONFIGURING APPLICATION PARAMETER OF MOBILE TERMINAL

CROSS-REFERENCE TO RELATED APPLICATIONS

This application is a continuation of International Application No. PCT/CN2012/080591, filed on Aug. 25, 2012, which claims priority to Chinese Patent Application No. 201110246506.7, filed on Aug. 25, 2011, both of which are hereby incorporated by reference in their entireties.

TECHNICAL FIELD

The present application relates to the field of mobile terminal applications, and in particular, to configuring an application parameter of a mobile terminal.

BACKGROUND

Parameter configuration of a mobile terminal is a very important function. When a user buys a mobile terminal, the user certainly hopes that various parameters of the mobile terminal are preset properly. For example, if Internet access parameters, multimedia messaging service (MMS) parameters, and bookmark parameters of the mobile terminal are preset properly, the user may start to use the mobile terminal without further configuration, and thus obtain pleasant user experience. In addition, it might be quite difficult for an ordinary user to manually modify or configure some complicated parameters, such as access point names (APN).

In the prior art, automatic parameter configurations may be realized by a software client installed in a mobile terminal. The software client supports an open mobile alliance client provisioning (OMA CP) protocol. This kind of parameter configuration by a software client is an earliest solution for the parameter configuration. The solution includes: a user asks to configure some functions of a mobile terminal, such as Internet access parameters and email parameters, through selections on the Internet or by inquiring the customer service department of an operator; the network delivers a configuration file that is based on the OMA CP protocol to the mobile terminal; after receiving the configuration file, the mobile terminal configures corresponding parameters of the mobile terminal according to a content of the configuration file.

In the prior art, a user must initiate a parameter configuration request to a network side or the customer service department of an operator. In initiating the request, the user usually needs to provide information of the mobile terminal, and therefore sending the request might become a complicated task. In addition, mobile terminals have different degrees of support for the OMA CP, and the OMA CP is not applicable to all mobile terminals. Furthermore, because the OMA CP protocol was launched in an earlier date, parameters corresponding to a lot of newer functions of the mobile terminals cannot be configured by using the OMA CP.

SUMMARY

Embodiments of the present application provide a method, related apparatus, and system for configuring an application parameter of a mobile terminal, so as to configure the application parameter of the mobile terminal conveniently.

In a first aspect, the present application provides a method for configuring an application parameter of a mobile terminal. The method includes:

establishing, by a mobile terminal, a near field communication (NFC) connection with a configuration device (referred to as "configurator" hereinafter);

negotiating, by the mobile terminal, a configuration manner with the configurator through the NFC connection;

receiving, by the mobile terminal, an application parameter sent by the configurator, where the application parameter is a parameter that is determined by the configurator according to the configuration manner negotiated between the mobile terminal and the configurator; and performing, by the mobile terminal, application parameter configuration for the mobile terminal according to the application parameter.

Optionally, if the configuration manner to be negotiated is a sending manner of the application parameter, the negotiating, by the mobile terminal, a configuration manner with the configurator through the NFC connection, specifically is:

negotiating, by the mobile terminal with the configurator, whether there is a file type jointly supported by the mobile terminal and the configurator, where the file type is a file type that allows the mobile terminal to execute configuration automatically; and if there is a file type jointly supported by the mobile terminal and the configurator, the receiving, by the mobile terminal, an application parameter sent by the configurator includes:

receiving, by the mobile terminal, through the NFC connection, a configuration file sent by the configurator, where the configuration file includes an application parameter that is obtained after the mobile terminal negotiates a configuration manner with the configurator, and the configuration file adopts a file type jointly supported by the mobile terminal and the configurator; or if there is no file type jointly supported by the mobile terminal and the configurator, the receiving, by the mobile terminal, an application parameter sent by the configurator includes:

receiving, by the mobile terminal, through the NFC connection, an application parameter sent by the configurator in a readable text format.

Optionally, if there is no file type jointly supported by the mobile terminal and the configurator, the receiving, by the mobile terminal, an application parameter sent by the configurator further includes:

sending, by the mobile terminal, software platform information of the mobile terminal to the configurator;

receiving, by the mobile terminal, an application program sent by the configurator, where the application program is a program that can be run by the mobile terminal and can configure the application parameter automatically;

installing, by the mobile terminal, the application program; and obtaining, by the mobile terminal, a configuration file sent by the configurator, where the configuration file includes an application parameter that is obtained after the mobile terminal negotiates a configuration manner with the configurator, and the configuration file adopts a file type jointly supported by the mobile terminal installed with the application program and the configurator.

Optionally, the obtaining, by the mobile terminal, a configuration file sent by the configurator includes:

receiving, by the mobile terminal, a configuration file that is separately sent by the configurator; or extracting, by the mobile terminal, the configuration file from the application program.

Optionally, if the negotiating a configuration manner includes negotiating a type of an application parameter and negotiating a sending manner of the application parameter, before the mobile terminal negotiates with the configurator whether there is a file type jointly supported by the mobile terminal and the configurator, the method includes:

receiving, by the mobile terminal, a type of an application parameter that is sent by the configurator and can be configured by the configurator;

selecting, by the mobile terminal, a type of an application parameter, which is supported by the mobile terminal, from the type of the application parameter that can be configured by the configurator; and sending, by the mobile terminal, the selected type of the application parameter to the configurator; or sending, by the mobile terminal, a type of an application parameter, which is supported by the mobile terminal, to the configurator, so that the configurator determines, according to the type of the application parameter, which is supported by the mobile terminal, a type of an application parameter that needs to be configured by the mobile terminal.

In a second aspect, the present application provides a method for configuring an application parameter of a mobile terminal, where the method includes:

establishing, by a configurator, a NFC connection with a mobile terminal;

negotiating, by the configurator, a configuration manner with the mobile terminal through the NFC connection; and sending, by the configurator, an application parameter to the mobile terminal according to a configuration manner negotiation result, where the application parameter is a parameter that is determined by the configurator according to the configuration manner negotiation result, so that the mobile terminal performs application parameter configuration according to the application parameter.

Optionally, if the negotiating a configuration manner is negotiating a sending manner of an application parameter, the negotiating, by the configurator, a configuration manner with the mobile terminal through the NFC connection, includes:

negotiating, by the configurator with the mobile terminal, whether there is a file type jointly supported by the configurator and the mobile terminal, where the file type is a file type that allows the mobile terminal to execute configuration automatically; and if there is a file type jointly supported by the configurator and the mobile terminal, the sending, by the configurator, an application parameter to the mobile terminal according to the configuration manner negotiation result, includes:

sending, by the configurator, a configuration file to the mobile terminal through the NFC connection, where the configuration file includes an application parameter that is obtained after the mobile terminal negotiates a configuration manner with the configurator, and the configuration file adopts a file type jointly supported by the mobile terminal and the configurator; or if there is no file type jointly supported by the configurator and the mobile terminal, the sending, by the configurator, an application parameter to the mobile terminal according to the configuration manner negotiation result, includes:

sending, by the configurator, an application parameter to the mobile terminal in a readable text format through the NFC connection.

Optionally, if there is no file type jointly supported by the configurator and the mobile terminal, the sending, by the configurator, an application parameter to the mobile terminal according to the configuration manner negotiation result, further includes:

obtaining, by the configurator, software platform information of the mobile terminal; determining whether the mobile terminal is a smart mobile terminal; and if the mobile terminal is not a smart mobile terminal, sending, by the configurator, an application parameter to the mobile terminal in a readable text format through the NFC connection; or if the mobile terminal is a smart mobile terminal, determining whether the configurator has an application program that is suitable for a software platform of the mobile terminal, where the application program is a program that can configure the application parameter automatically; and if the configurator has no application program that is suitable for the software platform of the mobile terminal, sending, by the configurator, an application parameter to the mobile terminal in a readable text format through the NFC connection; or if the configurator has an application program that is suitable for the software platform of the mobile terminal, sending, by the configurator, the application program to the mobile terminal.

Optionally, if the negotiating a configuration manner includes negotiating a type of an application parameter and negotiating a sending manner of the application parameter, before the configurator negotiates with the mobile terminal whether there is a file type jointly supported by the configurator and the mobile terminal, the method includes:

sending, by the configurator, a type of an application parameter that can be configured by the configurator to the mobile terminal, so that the mobile terminal selects a type of an application parameter, which is supported by the mobile terminal, from the type of the application parameter that can be configured by the configurator, and returns the selected type of the application parameter to the configurator; or receiving, by the configurator, a type of an application parameter, which is supported by the mobile terminal and sent by the mobile terminal, and determining, by the configurator, according to the type of the application parameter, which is supported by the mobile terminal, a type of an application parameter that needs to be configured by the mobile terminal.

In a third aspect, the present application provides a mobile terminal, including:

an NFC connecting unit, configured to establish a NFC connection with a configurator;

a configuration negotiating unit, configured to negotiate a configuration manner with the configurator through the NFC connection;

a configuration receiving unit, configured to receive an application parameter sent by the configurator, where the application parameter is a parameter that is determined by the configurator according to a configuration manner negotiation result; and a configuring unit, configured to perform application parameter configuration for the mobile terminal according to the application parameter.

Optionally, the configuration negotiating unit includes:

a type negotiating module, configured to: negotiate with the configurator whether there is a file type jointly supported by the configurator and the mobile terminal; and if there is a file type jointly supported by the configurator and the mobile terminal, trigger a file receiving module; or if there is no file type jointly supported by the configurator and the mobile terminal, trigger a parameter receiving module.

The configuration receiving unit includes:

the file receiving module, configured to receive, through the NFC connection, a configuration file sent by the configurator, where the configuration file includes an application parameter that is obtained after the mobile terminal negotiates a configuration manner with the configurator, and the configuration file adopts a file type jointly supported by the mobile terminal and the configurator; and the parameter receiving module, configured to receive, through the NFC connection, an application parameter sent by the configurator in a readable text format.

Optionally, the configuration negotiating unit further includes:

an application negotiating module, configured to:

receive a type of an application parameter that is sent by the configurator and can be configured by the configurator;

select a type of an application parameter, which is supported by the mobile terminal, from the type of the application parameter that can be configured by the configurator; and send the selected type of the application parameter to the configurator; or configured to send a type of an application parameter, which is supported by the mobile terminal, to the configurator, so that the configurator determines, according to the type of the application parameter, which is supported by the mobile terminal, a type of an application parameter that needs to be configured by the mobile terminal.

Optionally, the mobile terminal further includes:

an information sending unit, configured to send software platform information of the mobile terminal to the configurator after the type negotiating module determines that there is no file type jointly supported by the mobile terminal and the configurator;

a program receiving unit, configured to receive an application program sent by the configurator, where the application program is a program that can be run by the mobile terminal and can configure the application parameter automatically; and a program installing unit, configured to install the application program received by the program receiving unit.

Optionally, the configuration receiving unit further includes:

a file extracting module, configured to extract the configuration file from the application program, and trigger the configuring unit after extracting the configuration file.

In a fourth aspect, the present application provides a configurator, including:

a connecting unit, configured to establish a NFC connection with a mobile terminal;

a negotiating unit, configured to negotiate a configuration manner with the mobile terminal through the NFC connection; and a first sending unit, configured to send an application parameter to the mobile terminal according to a configuration manner negotiation result, where the application parameter is a parameter that is determined by the configurator according to the configuration manner negotiation result, so that the mobile terminal performs application parameter configuration according to the application parameter.

Optionally, the first sending unit includes:

a first sending module, configured to send a configuration file to the mobile terminal through the NFC connection, where the configuration file includes an application parameter that is obtained after the mobile terminal negotiates a configuration manner with the configurator, and the configuration file adopts a file type jointly supported by the mobile terminal and the configurator; and a second sending module, configured to send an application parameter to the mobile terminal in a readable text format through the NFC connection.

The negotiating unit includes:

a first negotiating module, configured to: negotiate with the mobile terminal whether there is a file type jointly supported by the configurator and the mobile terminal, where the file type is a file type that allows the mobile terminal to execute configuration automatically; and if there is a file type jointly supported by the configurator and the mobile terminal, trigger the first sending module; or if there is no file type jointly supported by the configurator and the mobile terminal, trigger the second sending module.

Optionally, the negotiating unit further includes:

a second negotiating module, configured to send a type of an application parameter that can be configured by the configurator to the mobile terminal, so that the mobile terminal selects a type of an application parameter, which is supported by the mobile terminal, from the type of the application parameter that can be configured by the configurator, and returns the selected type of the application parameter to the configurator; or configured to receive a type of an application parameter, which is supported by the mobile terminal and sent by the mobile terminal, and determine, according to the type of the application parameter, which is supported by the mobile terminal, a type of an application parameter that needs to be configured by the mobile terminal.

Optionally, the configurator further includes:

an obtaining unit, configured to obtain software platform information of the mobile terminal after the first negotiating module determines that there is no file type jointly supported by the configurator and the mobile terminal;

a first determining unit, configured to determine whether the mobile terminal is a smart mobile terminal, and if the mobile terminal is not a smart mobile terminal, trigger the second sending module, or if the mobile terminal is a smart mobile terminal, trigger a second determining unit;

the second determining unit, configured to determine whether the configurator has an application program that is suitable for a software platform of the mobile terminal, where the application program is a program that can be run by the mobile terminal and can configure the application parameter automatically, and if the configurator has no application program that is suitable for the software platform of the mobile terminal, trigger the second sending module, or if the configurator has an application program that is suitable for the software platform of the mobile terminal, trigger a second sending unit; and the second sending unit, configured to send the application program to the mobile terminal.

In a fifth aspect, the present application provides a system for configuring a parameter, including:

a mobile terminal and a configurator, where, the mobile terminal is configured to: establish a NFC connection with the configurator; negotiate a configuration manner with the configurator through the NFC connection; receive an application parameter sent by the configurator, where the application parameter is a parameter that is determined by the configurator according to a configuration manner negotiation result, and perform application parameter configuration according to the application parameter; and the configurator is configured to: establish the NFC connection with the mobile terminal; negotiate the configuration manner with the mobile terminal through the NFC connection; and send the application parameter to the mobile terminal according to the configuration manner negotiation result.

It can be seen from the foregoing technical solutions that the embodiments of the present application have the following advantages: In the embodiments of the present application, after a mobile terminal establishes a NFC connection with a configurator, the mobile terminal automatically negotiates a parameter configuration manner with the configurator through the NFC connection, so that the configurator sends an application parameter to the mobile terminal by using a manner that is adaptive to the mobile terminal. In this way, application parameter configuration for the mobile terminal is implemented. Because the mobile terminal automatically negotiates with the configurator through the NFC connection, the method for configuring a parameter according to the embodiments of the present application may extensively support mobile terminals of various models and functions.

DETAILED DESCRIPTION OF THE EMBODIMENTS

Embodiments of the present application provide a method, related apparatus, and system for configuring an application parameter of a mobile terminal, so as to configure the application parameter of the mobile terminal conveniently.

Figure 1:
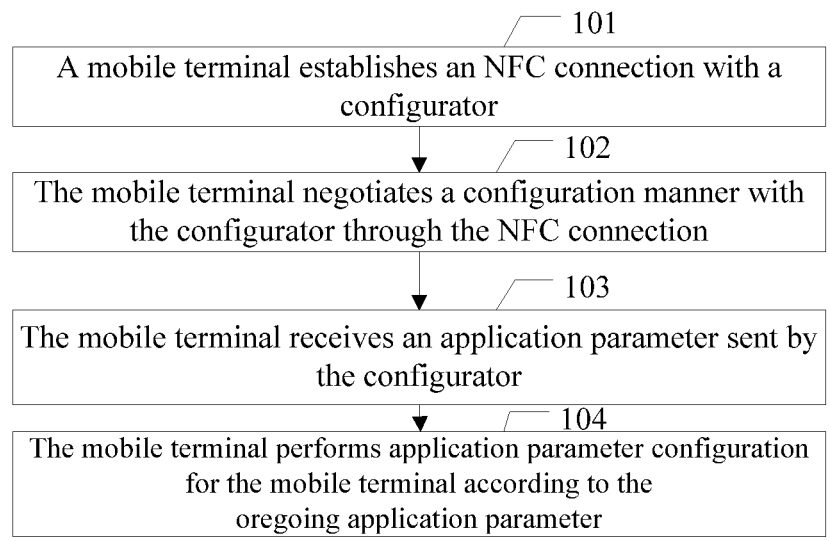
FIG. 1 is a flowchart of a method for configuring an application parameter of a mobile terminal according to an embodiment of the present application.

Referring to FIG. 1, a method for configuring an application parameter of a mobile terminal according to an embodiment of the present application includes:

101: A mobile terminal establishes a near field communication (NFC) connection with a configurator.

The mobile terminal and the configurator transmit authentication information to each other through radio frequency (RF) signals, and establish the NFC connection.

The NFC is a short-distance high frequency wireless communication technology, and can enable short-distance (within ten centimeters) wireless communications among mobile terminals, consumer electronic devices, computers, and intelligently controlled devices. The NFC provides a simple touch-enabled solution, and enables a consumer to exchange information and access a content and service in a simple and visual manner. The NFC technology, integrating functions of a contactless card reader, a contactless card and a peer-to-peer communication device, has three working modes: a card mode, a peer-to-peer communication mode, and a card reader mode.

Card mode: An NFC device is used as a card device and may be used for contactless mobile payment applications such as shopping mall purchases and traffic tolls. A user only needs to take an NFC device in the card mode (which may be a mobile terminal) close to a contactless card reader, and then the user only needs to enter a password to confirm a transaction or receive the transaction directly. In this mode, the card is powered by a radio frequency domain of the contactless card reader, that is, the NFC device in the card mode can still work even it has no power.

Peer-to-peer communication mode: this mode enables wireless data exchange between two NFC devices in the peer-to-peer communication mode, for example, downloading music, exchanging a picture, or synchronizing an address book between the devices.

Card reader mode: An NFC device is used as a contactless card reader. For example, an NFC device reads information from a poster or an exhibition information electronic label.

Based on the basic performance of the NFC technology as described above, in step 101, the NFC enabled mobile terminal may initiate an NFC connection with the configurator (which is also an NFC enabled device) as long as the mobile terminal is close to the configurator (a distance within ten centimeters). In an actual application, the mobile terminal and the configurator may be mutually used as a reading device or a read device. The mobile terminal may initiate an NFC connection, or the configurator may initiate an NFC connection, depending on an actual situation and is not limited herein.

If the mobile terminal is used as an initiating device, the mobile terminal sends radio frequency signals to a surrounding area at a regular time interval, and waits to see whether a response can be received from a peer device, such as a configurator; if a response is received from the configurator, the mobile terminal identifies parameter information (including a device type and an implemented function) of the configurator, and checks whether an NFC connection can be established. Meanwhile, the mobile terminal also sends related parameter information to the configurator. After the mobile terminal and the configurator perform mutual authentication, an NFC connection is established.

102: The mobile terminal negotiates a manner for receiving an application parameter with the configurator through the NFC connection.

After the mobile terminal establishes an NFC connection with the configurator, the mobile terminal negotiates the manner for receiving the application parameter with the configurator through the NFC connection. the contents in the manner for receiving the application parameter may include a sending manner of the application parameter by the configurator (e.g. the application parameter may be sent by using a configuration file or it may be recorded in a readable text format) and a type of the application parameter that needs to be configured, where the type of the application parameter is a type of various functional applications of the mobile terminal.

103: The mobile terminal receives the application parameter sent by the configurator in the negotiated manner.

The mobile terminal receives an application parameter sent by the configurator in the negotiated manner, where the application parameter is a parameter that is determined by the configurator.

The configurator pre-stores application parameter that is matched with an application scenario of the mobile terminal. For example, if the application scenario of the mobile terminal is a cinema, an administrator of the cinema presets several application parameters that are matched with a scenario of the cinema (for example, an application parameter for setting the mobile terminal to a silent mode, an application parameter for blocking/providing wireless Internet access in the cinema, and the like). In a specific implementation process, the configurator may also interact with a server of an application parameter through a network to obtain the application parameter that is matched with the application scenario of the mobile terminal. The foregoing descriptions are only two implementation examples, and other examples obtained by persons of ordinary skilled in the art based on the foregoing description also fall within the protection scope of the present application.

104: The mobile terminal performs an application parameter configuration according to the received application parameter.

After the mobile terminal receives the application parameter, according to an actual situation, the user may manually configure a related parameter of the mobile terminal according to the application parameter, and the mobile terminal completes application parameter configuration according to an operation command of the user. The mobile terminal may also execute the parameter configuration automatically. The specific configuration is described in subsequent embodiments, and is not limited herein.

The foregoing configurator refers to an NFC data configuration device with a function of configuring an application parameter of a mobile terminal, and includes at least an NFC module (including an antenna, an NFC chip, and the like), a data storing module, and a main control module (configured to control interaction with another NFC device).

Concepts such as an application parameter and an application scenario are described in the following by using some examples:

For example, if an application scenario is a cinema, an administrator of the cinema presets some application parameters in the configurator according to an actual scenario of the cinema, so that a customer going to the cinema can conveniently configure an application parameter of his/her mobile terminal to that is suitable for a cinema scenario. For example, a configurator in the cinema may set a scenario mode (a type of an application parameter) of the mobile terminal to a silent mode. This is done by the configurator sending a corresponding parameter (an application parameter) such as "scenario mode=silent" to the mobile terminal. Other application parameters of the mobile terminal may be similarly configured. For example, if a wireless network is set in the cinema, the configurator may negotiate an Internet access mode (a type of an application parameter) with the mobile terminal. If the mobile terminal supports a wireless local area network (WLAN) technology, the configurator of the cinema sends to the mobile terminal information of an Internet access mode (that is WLAN) and an account and password (an application parameter) needed for logging in to the WLAN.

The application scenario of this embodiment is illustrated through only some examples, and it may be understood that, in an actual application, more application scenarios may exist, which is not specifically limited herein.

In this embodiment of the application, after a mobile terminal establishes a NFC connection with a configurator, the mobile terminal automatically negotiates a parameter configuration manner with the configurator through the NFC connection, so that the configurator sends an application parameter to the mobile terminal by using a manner that is adaptive to the mobile terminal. In this way, application parameter configuration for the mobile terminal is implemented. Because the mobile terminal automatically negotiates with the configurator through the NFC connection, the method for configuring a parameter according to this embodiment of the present application may extensively support mobile terminals of various models and functions.

In the present application, a manner for configuring an application parameter of a mobile terminal may be that the mobile terminal performs configuration intelligently by using an identifiable configuration file, and may also be that a user of the mobile terminal performs configuration manually.

Figure 2:
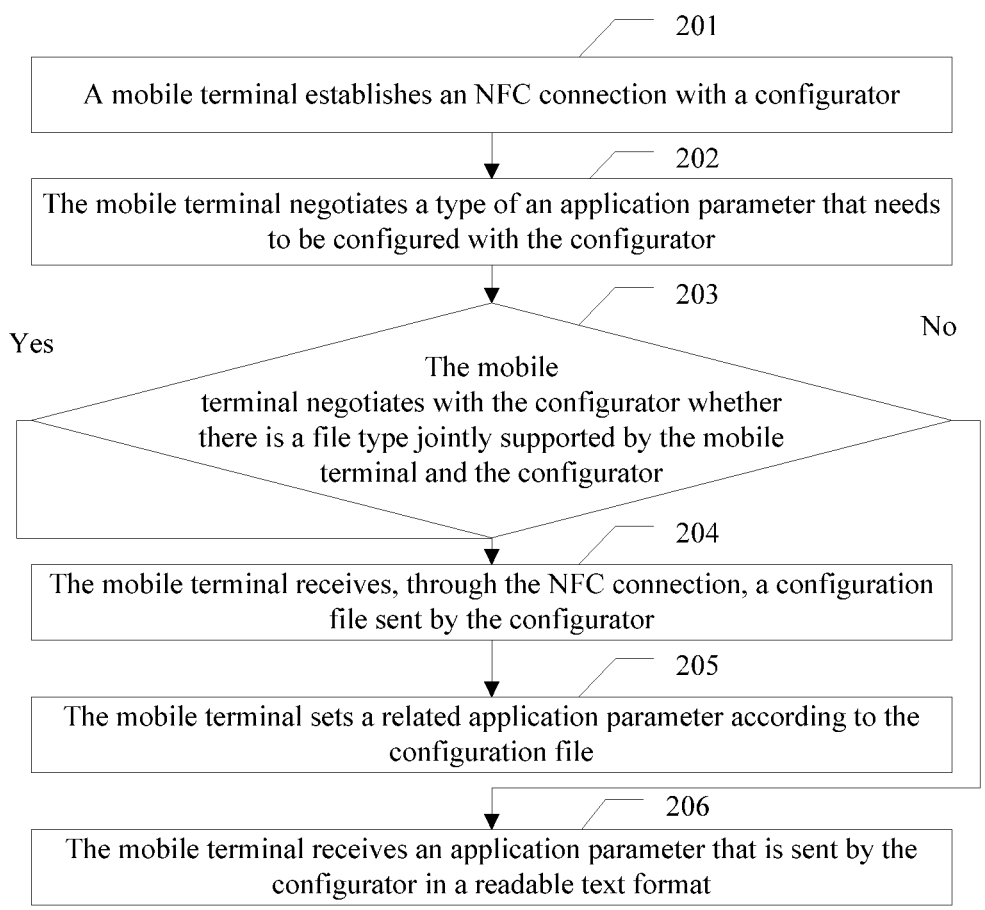
FIG. 2 is another flowchart of a method for configuring an application parameter of a mobile terminal according to an embodiment of the present application.

As shown in FIG. 2, another embodiment of a method for configuring an application parameter of a mobile terminal according to an embodiment of the present application includes:

201: A mobile terminal establishes an NFC connection with a configurator.

A content of step 201 in this embodiment is the same as that of step 101 in the embodiment shown in FIG. 1, and is not further described herein.

202: The mobile terminal negotiates a type of an application parameter that needs to be configured with the configurator.

The mobile terminal negotiates, through the NFC connection, a type of an application parameter that needs to be configured with the configurator. A negotiation process may be as follows: The configurator sends a function that can be implemented by the configurator to the mobile terminal, and the mobile terminal intelligently identifies a function that can be supported by the mobile terminal, and then returns a type of an application parameter that can be configured by the mobile terminal to the configurator; or the configurator sends functions that can be implemented by the configurator to the mobile terminal in a list form, so that a user itself selects different types of application parameters for configuration.

In addition, the mobile terminal may also send a type of an application parameter, which can be supported by the mobile terminal, to the configurator, and the configurator selects all types of application parameters, which can be supported by the mobile terminal, to set a configuration file. It is understandable that in an actual application, another implementation manner for the mobile terminal to negotiate the type of the application parameter with the configurator may also exist, which is not specifically limited herein.

There are various types of application parameters. For example, after a vCard type of data is imported into a mobile phone, contacts of the mobile phone may be added; after data in a vCalendar format is imported into the mobile phone, a corresponding calendar event reminder may be added; and after data in a vNotes format is imported into the mobile phone, a corresponding note content may be added. The data may be transmitted and configured by using the configurator in this embodiment of the present application. The configurator pre-configures one content or a combination of multiple contents, so that a quite complex function may be configured for the mobile terminal. For example, when a user buys a movie ticket through a mobile terminal, a configurator of a cinema may not only send a movie related content to the mobile terminal through the vNotes, but also set up a calendar event reminder for the user. When the movie is to begin, the calendar event reminder reminds the user of entering the cinema and setting the mobile phone to a silent mode. In addition, if the mobile terminal is a smart device (for example, a smart phone), the configurator configures more intelligent functions for the mobile terminal.

203: The mobile terminal negotiates with the configurator whether there is a file type jointly supported by the mobile terminal and the configurator.

The mobile terminal negotiates with the configurator, through the NFC connection, whether there is a file type jointly supported by the configurator and the mobile terminal, where the file type refers to a file type that allows the mobile terminal to configure an application parameter automatically; and if there is a file type jointly supported by the configurator and the mobile terminal, step 204 is executed; or if there is no file type jointly supported by the configurator and the mobile terminal, step 206 is executed.

The file type may be a file type in various mobile phone systems, for example, an application file in the ANDROID system, an application file in the SYMBIAN system, or an application file in the Windows system. The foregoing various systems have different versions, for example, ANDROID 2.0, ANDROID 2.1, and ANDROID 2.2.

A process in which the mobile terminal negotiates with the configurator the file type jointly supported by the mobile terminal and the configurator may be as follows: The configurator sends, in sequence, a file type that can be supported by the configurator to the mobile terminal for identification; if the mobile terminal makes no response or returns a response message, which indicates that a file type cannot be supported, within a preset duration, it indicates that the mobile terminal cannot support the file type, and the configurator continues to send another file type to the mobile terminal for identification until the configurator sends all file types that can be supported by the configurator completely; if there is still no file type jointly supported by the mobile terminal and the configurator, step 206 is executed; or if the mobile terminal can return a response message indicating that a file type is supported, step 204 is executed. The foregoing process of negotiating the file type may also be as follows: The configurator sends various file types that can be supported by the configurator to the mobile terminal in a list form; and the mobile terminal intelligently identifies a file type or the user itself selects a file type. It is understandable that in an actual application, another implementation manner for the mobile terminal to negotiate with the configurator the file type jointly supported by the mobile terminal and the configurator may also exist, which is not specifically limited herein.

204: The mobile terminal receives, through the NFC connection, a configuration file sent by the configurator.

The mobile terminal receives, through the NFC connection, a configuration file sent by the configurator, where the configuration file includes various types of application parameters obtained through negotiation in step 202 and specific contents of the application parameters, and the configuration file adopts a file type jointly supported by the mobile terminal and the configurator.

After it is determined through negotiation that there is a file type jointly supported by the mobile terminal and the configurator in step 203, the configurator constructs a configuration file by using the file type jointly supported by the mobile terminal and the configurator, so that the mobile terminal automatically configures various application parameters in the configuration file according to the configuration file. The configuration file may be transmitted once in a packaged way, and may also be transmitted for multiple times by dividing a content of the configuration file into several small data packets (because the configuration file may be too large to be transmitted once), which depends on an actual situation and is not specifically limited herein.

205: The mobile terminal sets a related application parameter according to the configuration file.

The mobile terminal automatically sets a related application parameter in the mobile terminal according to the application parameter in the foregoing configuration file.

The foregoing configuration file adopts a file type that allows the mobile terminal to execute configuration automatically. Therefore, when receiving the configuration file, the mobile terminal can automatically parse the application parameter in the configuration file. According to an actual situation, if the NFC connection established by the mobile terminal with the configurator is in reading and read mode, the mobile terminal may automatically execute a parameter matching function of the configuration file after receiving the configuration file, extract various types of application parameters from the configuration file, and set the extracted application parameters in various corresponding functional applications of the mobile terminal respectively; and if the NFC connection established by the mobile terminal with the configurator is in peer-to-peer transmission mode, after the mobile terminal receives the configuration file, the user itself chooses whether to execute the parameter matching function of the configuration file (after receiving the configuration file completely, the mobile terminal may prompt the user whether to execute the configuration file).

206: The mobile terminal receives an application parameter that is sent by the configurator in a readable text format.

The mobile terminal receives, through the NFC connection, an application parameter that is sent by the configurator in a readable text format, where the readable text format is a file format that is configured for non-automatic execution and can be opened by the user to read a text content.

After the negotiation is performed in step 203, if the mobile terminal determines that there is no file type jointly supported by the mobile terminal and the configurator (a file type that allows the mobile terminal to configure an application parameter automatically), the configurator records, in a readable text format, various types of application parameters negotiated in step 202 and specific contents of the application parameters, and sends this readable text to the mobile terminal. In this way, after the mobile terminal receives the readable text that records the foregoing application parameters, the user may set a related content manually according to the application parameters recorded in the readable text, and the mobile terminal completes application parameter configuration for the mobile terminal according to an operation command of the user.

Figure 3:
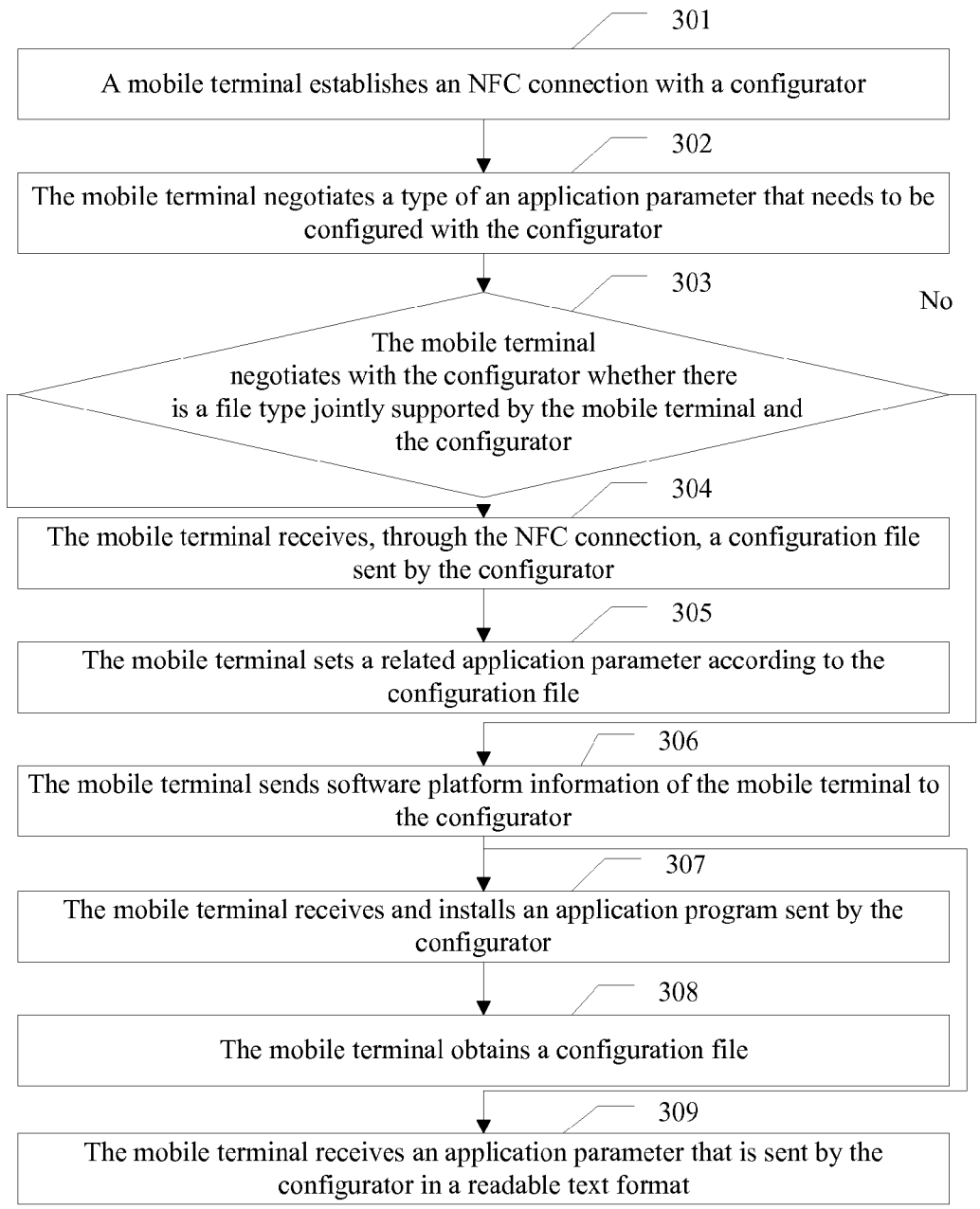
FIG. 3 is another flowchart of a method for configuring an application parameter of a mobile terminal according to an embodiment of the present application.

After it is determined that there is no file type jointly supported by the current mobile terminal and the configurator, the configurator may also install a related application program for the mobile terminal according to software platform information of the mobile terminal, so that the mobile terminal supports a corresponding file type. Specifically, referring to FIG. 3, another embodiment of a method for configuring an application parameter of a mobile terminal according to an embodiment of the present application includes:

301: A mobile terminal establishes an NFC connection with a configurator.

A content of step 301 in this embodiment is the same as that of step 101 in the embodiment shown in FIG. 1, and is not further described herein.

302: The mobile terminal negotiates a type of an application parameter that needs to be configured with the configurator.

A content of step 302 in this embodiment is the same as that of step 202 in the embodiment shown in FIG. 2, and is not further described herein.

303: The mobile terminal negotiates with the configurator whether there is a file type jointly supported by the mobile terminal and the configurator.

The mobile terminal negotiates with the configurator, through the NFC connection, whether there is a file type jointly supported by the mobile terminal and the configurator, where the file type refers to a file type that allows the mobile terminal to configure an application parameter automatically; and if there is a file type jointly supported by the mobile terminal and the configurator, step 304 is executed; or if there is no file type jointly supported by the mobile terminal and the configurator, step 306 is executed.

304: The mobile terminal receives, through the NFC connection, a configuration file sent by the configurator.

The mobile terminal receives, through the NFC connection, a configuration file sent by the configurator, where the configuration file includes various types of application parameters obtained through negotiation in step 302 and specific contents of the application parameters, and the configuration file adopts a file type jointly supported by the mobile terminal and the configurator.

305: The mobile terminal sets a related application parameter according to the configuration file.

The mobile terminal automatically sets a related parameter in the mobile terminal according to the application parameter in the foregoing configuration file.

The foregoing configuration file adopts a file type that allows the mobile terminal to execute configuration automatically. Therefore, when receiving the configuration file, the mobile terminal automatically parses the application parameter in the configuration file. According to an actual situation, if the NFC connection established by the mobile terminal with the configurator is in reading and read mode, the mobile terminal may automatically execute a parameter matching function of the configuration file after receiving the configuration file, extract various types of application parameters from the configuration file, and set the extracted application parameters in various corresponding functional applications of the mobile terminal respectively; and if the NFC connection established by the mobile terminal with the configurator is in peer-to-peer transmission mode, after the mobile terminal receives the configuration file, a user itself chooses whether to execute the parameter matching function of the configuration file.

306: The mobile terminal sends software platform information of the mobile terminal to the configurator.

After it is determined that there is no file type jointly supported by the mobile terminal and the configurator (a file type that allows the mobile terminal to configure an application parameter automatically), the mobile terminal sends software platform information of the mobile terminal to the configurator, so that the configurator may determine, according to the software platform information, whether the mobile terminal can install a corresponding application program, where the software platform information may be a system platform supported by the mobile terminal and a file type that can be installed on the system platform.

After receiving the software platform information of the mobile terminal, the configurator determines, according to the software platform information, whether the mobile terminal is a smart mobile terminal; and if the mobile terminal is not a smart mobile terminal, the configurator sends an application parameter to the mobile terminal in a readable text format through the NFC connection; or if the mobile terminal is a smart mobile terminal, the configurator determines whether the configurator has an application program that is suitable for a software platform of the mobile terminal, where the application program is a program that can be run by the mobile terminal and can configure an application parameter automatically, and if the configurator has no application program that is suitable for the software platform of the mobile terminal, the configurator sends an application parameter to the mobile terminal in a readable text format through the NFC connection, or if the configurator has an application program that is suitable for the software platform of the mobile terminal, the configurator sends the application program to the mobile terminal. The foregoing smart mobile terminal is a mobile terminal whose function can be extended by installing a third-party application program.

307: The mobile terminal receives and installs an application program sent by the configurator.

Optionally, according to an actual situation, if a local mobile terminal is a smart mobile terminal and has a function of installing the foregoing application program the mobile terminal can receive the application program sent by the configurator.

After receiving the application program, according to an actual situation, if the NFC connection established by the mobile terminal with the configurator is in reading and read mode, the mobile terminal may automatically install the application program after receiving the application program; and if the NFC connection established by the mobile terminal with the configurator is in peer-to-peer transmission mode, after receiving the application program, the mobile terminal prompts the user whether to install the application program, so that the user itself chooses whether to install the application program.

308: The mobile terminal obtains a configuration file.

Optionally, according to an actual situation, the configurator may package the configuration file into an installation file of the application program. Therefore, after installation is completed, the configuration file may be directly opened to execute an automatic configuration function of the configuration file. The configuration file adopts a file type jointly supported by the mobile terminal that is installed with the application program and the configurator. Therefore, if the foregoing application program carries the configuration file, the mobile terminal extracts the configuration file from the application program after installing the application program, and then step 305 is executed; or if the foregoing application program do not carry the configuration file, optionally, in an actual application, after installing the application program, the mobile terminal may return a response indicating that the application program has already been installed to the configurator, and wait for the configurator to send a configuration file; or, when or after the configurator sends the application program, the configurator does not need to wait for an installation response from the mobile terminal, but sends the configuration file to the mobile terminal directly.

309: The mobile terminal receives an application parameter that is sent by the configurator in a readable text format.

Optionally, according to an actual situation, if the local mobile terminal is a non-smart mobile terminal or does not have a function of installing the foregoing application program, the mobile terminal receives an application parameter that is sent by the configurator in a readable text format.

After the configurator determines that the mobile terminal is a non-smart mobile terminal or does not have a function of installing the foregoing application program, the configurator records, in a readable text format, various types of application parameters negotiated in step 302 and specific contents of the application parameters, and sends this readable text to the mobile terminal. In this way, after the mobile terminal receives the readable text that records the foregoing application parameters, the user may set a related content manually according to the application parameters recorded in the readable text, and the mobile terminal completes application parameter configuration for the mobile terminal according to an operation command of the user.

Figure 4:
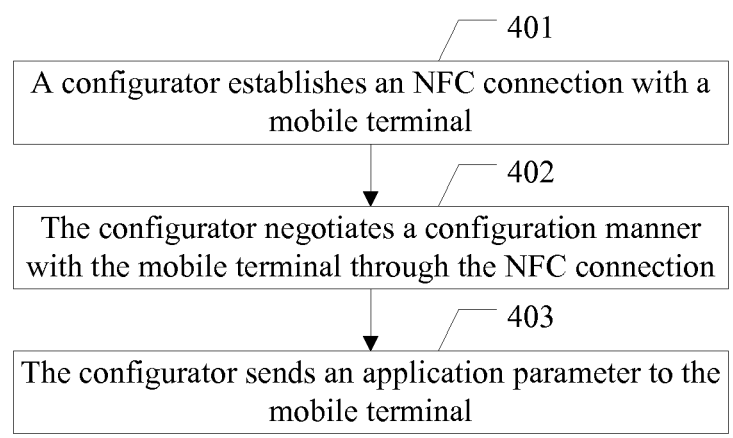
FIG. 4 is another flowchart of a method for configuring an application parameter of a mobile terminal according to an embodiment of the present application.

The method for configuring an application parameter of a mobile terminal according to the embodiments of the present application is described in the foregoing from the perspective of a mobile terminal. The method for configuring an application parameter of a mobile terminal according to the embodiments of the present application is described in the following from the perspective of a configurator. As shown in FIG. 4, another embodiment of a method for configuring an application parameter of a mobile terminal according to an embodiment of the present application includes:

401: A configurator establishes an NFC connection with a mobile terminal.

The mobile terminal and the configurator transmit authentication information to each other through a radio frequency signal, and establish an NFC connection.

402: The configurator negotiates a configuration manner with the mobile terminal through the NFC connection.

After the configurator establishes an NFC connection with the mobile terminal, the configurator negotiates a configuration manner with the mobile terminal through the NFC connection. Contents of the negotiating a configuration manner may include a sending manner of an application parameter (the application parameter may be set by using a configuration file or may be recorded directly in a readable text format) and a type of an application parameter that needs to be configured, where the type of the application parameter is a type of various functional applications of the mobile terminal.

The configurator pre-stores an application parameter that is matched with an application scenario of the configurator. When negotiating a configuration manner with the mobile terminal, the configurator may negotiate a type of an application parameter that needs to be configured with the mobile terminal (that is, the configurator selects, from the pre-stored application parameter, an application parameter that needs to be configured by the mobile terminal). After the negotiation is ended, the configurator sends a corresponding application parameter to the mobile terminal according to a negotiation result.

403: The configurator sends an application parameter to the mobile terminal.

The configurator sends an application parameter to the mobile terminal according to the foregoing configuration manner negotiation result (the foregoing negotiation result decides a specific type of an application parameter that should be sent by the configurator, and a sending manner of the application parameter), so that the mobile terminal may finish configuring a related parameter according to the application parameter.

In this embodiment of the present application, after a mobile terminal establishes an NFC connection with a configurator, the configurator automatically negotiates a parameter configuration manner with the mobile terminal through the NFC connection, and sends an application parameter to the mobile terminal according to a result of negotiating with the terminal, so that the mobile terminal may implement parameter configuration. Because the configurator automatically negotiates with the mobile terminal through the NFC connection, the method for configuring a parameter according to this embodiment of the present application may extensively support mobile terminals of various models and functions.

Figure 5:
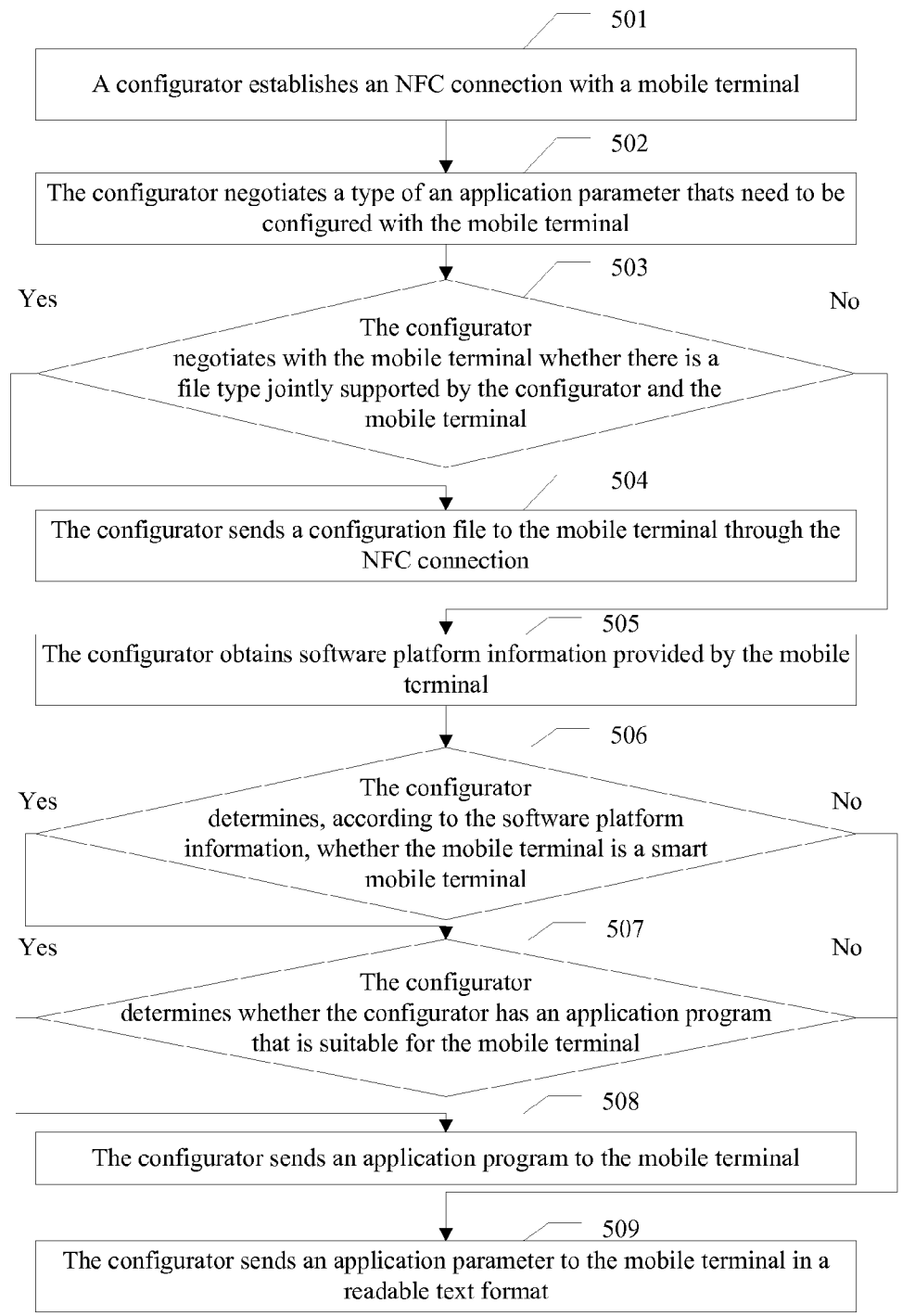
FIG. 5 is another flowchart of a method for configuring an application parameter of a mobile terminal according to an embodiment of the present application.

The present application provides multiple manners for implementing application parameter transmission. Specifically, referring to FIG. 5, another embodiment of a method for configuring an application parameter of a mobile terminal according to an embodiment of the present application includes:

501: A configurator establishes an NFC connection with a mobile terminal.

A content of step 501 in this embodiment is the same as that of step 401 in the embodiment shown in FIG. 4, and is not further described herein.

502: The configurator negotiates a type of an application parameter that needs to be configured with the mobile terminal.

The configurator negotiates, through the NFC connection, a type of an application parameter that needs to be configured with the mobile terminal. A negotiation process may be as follows: The configurator sends a function that can be implemented by the configurator to the mobile terminal, and the mobile terminal intelligently identifies a function that can be implemented by the mobile terminal, and then returns a type of an application parameter that can be configured (or needs to be configured) by the mobile terminal to the configurator; or the configurator sends functions that can be implemented by the configurator to the mobile terminal in a list form, so that a user itself selects different types of application parameters for configuration.

In addition, the mobile terminal may also send a type of an application parameter, which can be supported by the mobile terminal, to the configurator, and the configurator selects all types of application parameters, which can be supported by the mobile terminal, to set a configuration file. It is understandable that in an actual application, another implementation manner for the mobile terminal to negotiate the type of application parameter with the configurator may also exist, which is not specifically limited herein.

503: The configurator negotiates with the mobile terminal whether there is a file type jointly supported by the configurator and the mobile terminal.

The mobile terminal negotiates with the configurator, through the NFC connection, whether there is a file type jointly supported by the configurator and the mobile terminal; and if there is a file type jointly supported by the configurator and the mobile terminal, step 504 is executed; or if there is no file type jointly supported by the configurator and the mobile terminal, step 505 is executed.

The file type refers to a file type that allows the mobile terminal to configure an application parameter automatically, and the file type may be a file type in various mobile phone systems.

A process in which the configurator negotiates with the mobile terminal the file type jointly supported by the configurator and the mobile terminal may be as follows: The configurator sends, in sequence, a file type that can be supported by the configurator to the mobile terminal for identification; if the mobile terminal makes no response or returns a response message, which indicates that a file type cannot be supported, within a preset duration, it indicates that the mobile terminal cannot support the file type, and the configurator continues to send another file type to the mobile terminal until the configurator sends all file types that can be supported by the configurator completely; if there is still no file type jointly supported by the configurator and the mobile terminal, step 505 is executed; and if the mobile terminal can return a response message indicating that a file type is supported, step 504 is executed. The foregoing process of negotiating the file type may also be as follows: The configurator sends various file types that can be supported by the configurator to the mobile terminal in a list form; and the mobile terminal intelligently identifies a file type or the user itself selects a file type. It is understandable that in an actual application, another implementation manner for the mobile terminal to negotiate with the configurator the file type jointly supported by the mobile terminal and the configurator may also exist, which is not specifically limited herein.

504: The configurator sends a configuration file to the mobile terminal through the NFC connection.

After it is determined through negotiation that there is a file type jointly supported by the mobile terminal and the configurator in step 503, the configurator sends a configuration file to the mobile terminal through the foregoing NFC connection, where the configuration file includes various types of application parameters obtained through negotiation in step 502 and specific contents of the application parameters, and the configuration file adopts a file type jointly supported by the mobile terminal and the configurator.

505: The configurator obtains software platform information provided by the mobile terminal.

After it is determined that there is no file type jointly supported by the mobile terminal and the configurator, the configurator obtains software platform information provided by the mobile terminal, where the software platform information may be a system platform supported by the mobile terminal and a file type that can be installed on the system platform.

506: The configurator determines, according to the software platform information, whether the mobile terminal is a smart mobile terminal.

After receiving the software platform information of the mobile terminal, the configurator determines, according to the software platform information, whether the mobile terminal is a smart mobile terminal; and if the mobile terminal is not a smart mobile terminal, step 509 is executed; or if the mobile terminal is a smart mobile terminal, step 507 is executed. The foregoing smart mobile terminal is a mobile terminal whose function can be extended by installing a third-party application program.

507: The configurator determines whether the configurator has an application program that is suitable for the mobile terminal.

The configurator determines, according to the software platform information, whether the configurator has an application program that is suitable for the mobile terminal, where the application program is a program that can be run by the mobile terminal and can configure an application parameter automatically; and if the configurator has no application program that is suitable for the mobile terminal, step 509 is executed; or if the configurator has an application program that is suitable for the mobile terminal, step 508 is executed.

508: The configurator sends an application program to the mobile terminal.

If the configurator determines that the configurator has an application program that is suitable for the mobile terminal, the configurator sends, through the NFC connection, the application program that is suitable for the mobile terminal to the mobile terminal.

Optionally, the configurator may carry a configuration file in the application program, where the configuration file adopts a file type jointly supported by the mobile terminal that is installed with the application program and the configurator, so that the mobile terminal can set a related parameter according to the configuration file immediately after finishing installing the application program; if the configurator does not carry a configuration file in the application program, optionally, the configurator may wait for a response, which indicates that the application program has been installed, from the mobile terminal; after the response is received, step 504 is executed; or when or after the application program is sent to the mobile terminal, step 504 is executed actively.

509: The configurator sends an application parameter to the mobile terminal in a readable text format.

If the configurator determines that the configurator has no application program that is suitable for the mobile terminal, the configurator sends an application parameter to the mobile terminal in a readable text format through the NFC connection, so that the user of the mobile terminal may manually set a related parameter of the mobile terminal according to the application parameter.

By using the mobile terminal and the configurator that have an NFC function, the user of the mobile terminal may configure a mobile phone parameter conveniently to implement fast and rich methods for managing a configuration item of a mobile phone. In addition, an operator can implement various scenario reminder functions conveniently, thereby improving user experience.

When the user enters a cinema, after buying a movie ticket by using the configurator with the NFC function, the user may set a calendar event reminder for the mobile phone and then the user may go shopping freely; and when the movie is ready to begin, the calendar event reminder reminds the user, so that the user does not need to worry about missing the movie. Meanwhile, after the user enters the cinema, the mobile phone is set to a silent mode, which avoids disturbing other audiences.

When the user enters a WIFI hotspot area, for example a KFC restaurant, after the user pays the bill through a configurator with an NFC function, the WIFI function of the mobile phone may be enabled automatically through parameter configuration of the configurator. After entering a corresponding password, the user may easily access the WIFI network of KFC without entering the WIFI password of KFC, thereby implementing a confidentiality function.

If the configurator is applied to a home user terminal, for example, when the user goes home, the user can open the door by using a configurator with an NFC function on the door, and apply related home configuration to the mobile phone by using the configurator, for example, accessing the home WIFI network automatically, turning down the ring tone of the mobile phone, or activating the alarm for next day, and the like.

The application scenario of this embodiment of the present application is illustrated through some examples, and it may be understood that, in an actual application, more application scenarios may exist, which is not specifically limited herein.

Figure 6:
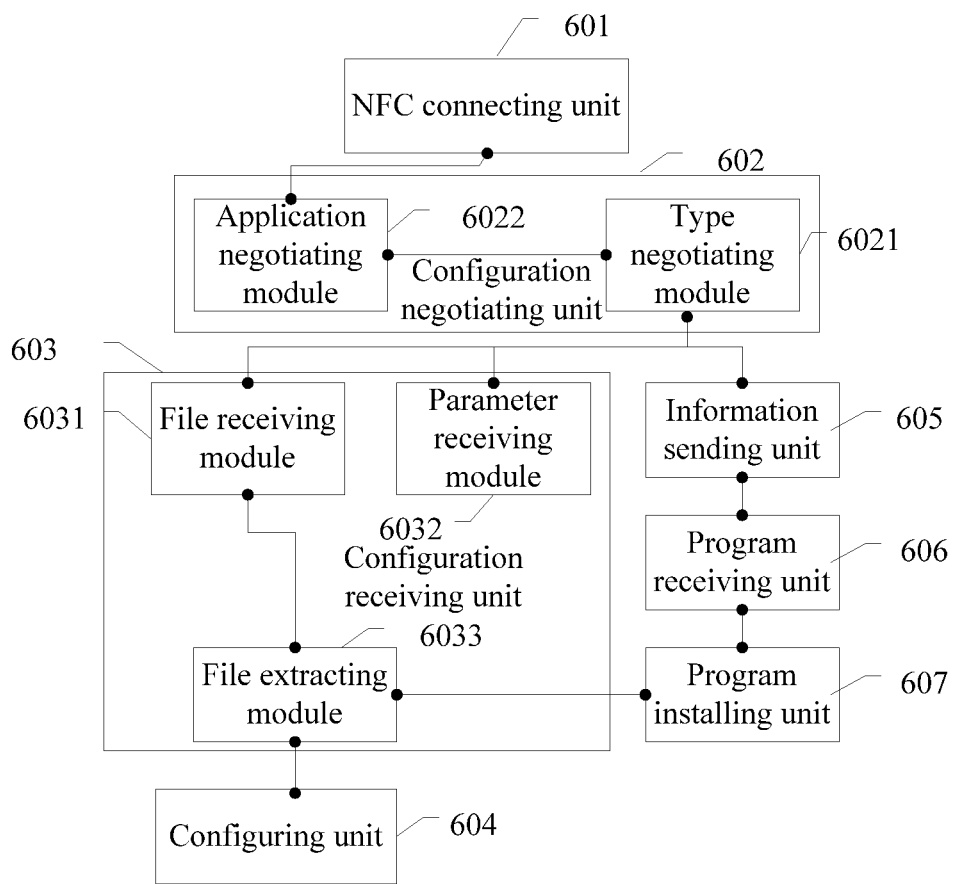
FIG. 6 is a simplified block diagram of a mobile terminal according to an embodiment of the present application.

An embodiment of a mobile terminal configured to execute the foregoing method for configuring an application parameter of a mobile terminal according to the present application is described in the following. Referring to a logical structure shown in FIG. 6, an embodiment of a mobile terminal according to an embodiment of the present application includes:

an NFC connecting unit 601, configured to establish an NFC connection with a configurator;

a configuration negotiating unit 602, configured to negotiate a configuration manner with the configurator through the NFC connection;

a configuration receiving unit 603, configured to receive an application parameter sent by the configurator, where the application parameter is a parameter that is determined by the configurator according to a configuration manner negotiation result; and a configuring unit 604, configured to perform application parameter configuration for the mobile terminal according to the foregoing application parameter.

The configuration negotiating unit 602 in this embodiment of the present application may include:

a type negotiating module 6021, configured to: negotiate with the configurator whether there is a file type jointly supported by the configurator and the mobile terminal; and if there is a file type jointly supported by the configurator and the mobile terminal, trigger a file receiving module 6031; or if there is no file type jointly supported by the configurator and the mobile terminal, trigger a parameter receiving module 6032; and an application negotiating module 6022, configured to: after the NFC connection is established, receive a type of an application parameter that is sent by the configurator and can be configured by the configurator, select a type of an application parameter, which is supported by the mobile terminal, from the type of the application parameter that can be configured by the configurator, and send the selected type of the application parameter to the configurator;

or, configured to send a type of an application parameter, which is supported by the mobile terminal, to the configurator, so that the configurator determines, according to the type of the application parameter, which is supported by the mobile terminal, a type of an application parameter that needs to be configured by the mobile terminal.

The configuration receiving unit 603 in this embodiment of the present application may include:

the file receiving module 6031, configured to receive, through the foregoing NFC connection, a configuration file sent by the configurator, where the configuration file includes an application parameter, that is, the configuration file includes an application parameter that is obtained after the mobile terminal negotiates a configuration manner with the configurator, and the configuration file adopts a file type jointly supported by the mobile terminal and the configurator;

the parameter receiving module 6032, configured to receive, through the foregoing NFC connection, an application parameter sent by the configurator in a readable text format; and a file extracting module 6033, configured to extract the configuration file from the foregoing application program, and trigger the configuring unit 604 after extracting the configuration file.

The mobile terminal in this embodiment of the present application may further include:

an information sending unit 605, configured to send software platform information of the mobile terminal to the configurator after the type negotiating module 6021 determines that there is no file type jointly supported by the mobile terminal and the configurator;

a program receiving unit 606, configured to receive an application program sent by the configurator, where the application program is a program that can be run by the mobile terminal and can configure the application parameter automatically; and a program installing unit 607, configured to install the application program received by the program receiving unit 606.

Specific interaction processes between units of the mobile terminal in this embodiment of the present application are as follows:

When the mobile terminal approaches the configurator, the NFC connecting unit 601 of the mobile terminal and the configurator transmit authentication information to each other through a radio frequency signal, and establish an NFC connection. Based on basic performance of an NFC technology, the mobile terminal may initiate an NFC connection with the configurator as long as the mobile terminal approaches the configurator (a distance within ten centimeters). In an actual application, the mobile terminal and the configurator may be mutually used as a reading device or a read device, that is, the mobile terminal may initiate an NFC connection, or the configurator may initiate an NFC connection, which depends on an actual situation specifically and is not limited herein. If the mobile terminal is used as an initiating device, the mobile terminal sends a radio frequency signal to a surrounding area at regular time, and waits to see whether a response can be received from a peer configurator; if a response can be received from the peer configurator, the mobile terminal identifies parameter information (including a device type and an implemented function) of the peer configurator, and checks whether an NFC connection can be established. Meanwhile, the mobile terminal also sends related parameter information to the configurator. After the mobile terminal and the configurator perform mutual authentication, an NFC connection can be established.

After the NFC connection is established, the configuration negotiating unit 602 negotiates a configuration manner with the configurator through the NFC connection. After the negotiating a configuration manner is completed, the configuration receiving unit 603 is triggered, so as to receive an application parameter sent by the configurator, where the application parameter is a parameter that is determined by the configurator according to a configuration manner negotiation result.

A negotiation process is specifically as follows: The application negotiating module 6022 negotiates, through the foregoing NFC connection, a type of an application parameter that needs to be configured with the configurator, where the type of the application parameter is very rich. For example, after a vCard type of data is imported into a mobile phone, contacts of the mobile phone may be added; after data in a vCalendar format is imported into the mobile phone, a corresponding calendar event reminder may be added; and after data in a vNotes format is imported into the mobile phone, a corresponding note content may be added. The data may be transmitted and configured by the configurator in this embodiment of the present application. The configurator pre-configures one content or a combination of multiple contents, so that a quite complex function may be configured for the mobile terminal. For example, when a user buys a movie ticket through a mobile terminal, a configurator in a cinema may not only send a movie related content to the mobile terminal through the vNotes, but also set up a calendar event reminder for the user. When the movie is ready to begin, the calendar event reminder reminds the user of entering the cinema and setting the mobile phone to a silent mode. In addition, if the mobile terminal is a smart device (for example, a smart phone), the configurator configures more intelligent functions for the mobile terminal.

After the negotiating the type of the application parameter is completed, the type negotiating module 6021 negotiates with the configurator whether there is a file type jointly supported by the configurator and the mobile terminal; and if there is a file type jointly supported by the configurator and the mobile terminal, the file receiving module 6031 is triggered; or if there is no file type jointly supported by the configurator and the mobile terminal, the parameter receiving module 6032 is triggered.

If the file receiving module 6031 is triggered, the file receiving module 6031 receives, through the foregoing NFC connection, a configuration file sent by the configurator, and continues to trigger the configuring unit 604, so as to set a related parameter in the mobile terminal automatically according to an application parameter in the configuration file, where the configuration file adopts a file type jointly supported by the mobile terminal (or a mobile terminal that is installed with a related application program) and the configurator. The configuration file includes various types of application parameters that are obtained through negotiation of the application negotiating module 6022 and specific contents of the application parameters.

After the configuration file is received, according to an actual situation, if the NFC connection established by the mobile terminal with the configurator is in reading and read mode, the mobile terminal may automatically execute a parameter matching function of the configuration file after receiving the configuration file, extract various types of application parameters from the configuration file, and set the extracted application parameters in various corresponding functional applications of the mobile terminal respectively; and if the NFC connection established by the mobile terminal with the configurator is in peer-to-peer transmission mode, after the mobile terminal receives the configuration file, the user itself chooses whether to execute the parameter matching function of the configuration file.

If the parameter receiving module 6032 is triggered, the parameter receiving module 6032 receives an application parameter that is sent by the configurator in a readable text format. In this way, after a readable text of the application parameter is received, the user may set a related content manually according to the application parameter recorded in the text, and the configuring unit 604 of the mobile terminal completes application parameter configuration for the mobile terminal according to an operation command of the user.

Optionally, if there is no file type jointly supported by the mobile terminal and the configurator through negotiation, the information sending unit 605 may further be triggered, so as to send software platform information of the mobile terminal to the configurator, so that the configurator may determine, according to the software platform information, whether the mobile terminal can install a corresponding application program, where the software platform information may be a system platform supported by the mobile terminal and a file type that can be installed on the system platform. If the mobile terminal is a smart mobile terminal and has a function of installing an application file, the program receiving unit 606 may receive an application program sent by the configurator. After the application program is received, according to an actual situation, if the NFC connection established by the mobile terminal with the configurator is in reading and read mode, the mobile terminal may automatically trigger the program installing unit 607, so as to install the application program received by the program receiving unit; and if the NFC connection established by the mobile terminal with the configurator is in peer-to-peer transmission mode, after receiving the application program, the mobile terminal prompts the user whether to install the application program, so that the user decides whether to trigger the program installing unit 607, so as to install the application program.

After the application program has been installed, in an actual application, the configurator may package a configuration file into an installation file of the application program. Therefore, after the installation is completed, the configuration file may be directly opened to execute an automatic configuration function of the configuration file. Therefore, optionally, according to an actual situation, if the application program carries the configuration file, the file extracting module 6033 is triggered, so as to extract the configuration file from the application program; and after the configuration file is extracted, the configuring unit 604 is triggered. If the application program does not carry the configuration file, after installing the application program, the mobile terminal may return a response indicating that the application program has already been installed to the configurator, and wait for the configurator to send a configuration file; or, when or after the configurator sends the application program, the configurator does not need to wait for an installation response from the mobile terminal, but sends the configuration file to the mobile terminal directly.

Specifically, an operation performed by the configuring unit 604 may involve the following two cases: If the mobile terminal performs configuration according to the configuration file, after the configuration file is received, the configuring unit 604 parses the configuration file directly, and configures a corresponding content automatically according to the application parameter in the configuration file; and if the mobile terminal receives an application parameter that is recorded in a readable text format, after the mobile terminal receives the application parameter, the user itself sets a corresponding content manually according to the application parameter, and the configuring unit 604 finishes configuring a corresponding parameter according to an operation command of the user.

Figure 7:
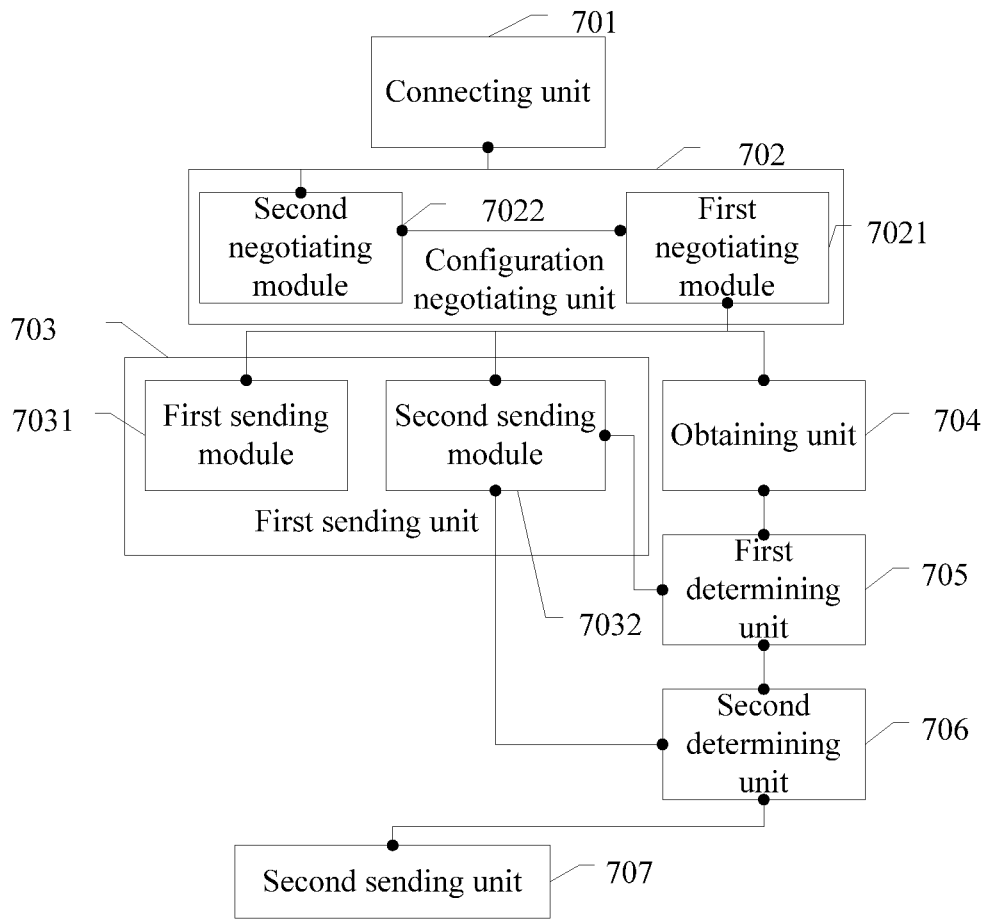
FIG. 7 is a simplified block diagram of a configurator according to an embodiment of the present application.

An embodiment of a configurator configured to execute the foregoing method for configuring an application parameter of a mobile terminal according to the present application is described in the following. Referring to a logical structure shown in FIG. 7, an embodiment of a configurator according to an embodiment of the present application includes:

a connecting unit 701, configured to establish a NFC connection with a mobile terminal;

a negotiating unit 702, configured to negotiate a configuration manner with the mobile terminal through the foregoing NFC connection; and a first sending unit 703, configured to send an application parameter to the mobile terminal according to a configuration manner negotiation result, where the application parameter is a parameter which is of the mobile terminal, pre-stored by the configurator, and matched with an application scenario of the configurator.

The first sending unit 703 in this embodiment of the present application may include:

a first sending module 7031, configured to send a configuration file to the mobile terminal through the foregoing NFC connection, where the configuration file includes an application parameter that is obtained after the mobile terminal negotiates a configuration manner with the configurator, and the configuration file adopts a file type jointly supported by the mobile terminal and the configurator; and a second sending module 7032, configured to send an application parameter to the mobile terminal in a readable text format through the foregoing NFC connection.

The negotiating unit 702 in this embodiment of the present application may include:

a first negotiating module 7021, configured to: negotiate with the mobile terminal whether there is a file type jointly supported by the configurator and the mobile terminal, where the file type is a file type that allows the mobile terminal to execute configuration automatically; and if there is a file type jointly supported by the configurator and the mobile terminal, trigger the first sending module 7031; or if there is no file type jointly supported by the configurator and the mobile terminal, trigger the second sending module 7032; and a second negotiating module 7022, configured to send a type of an application parameter that can be configured by the configurator to the mobile terminal, so that the mobile terminal selects a type of an application parameter, which is supported by the mobile terminal, from the type of the application parameter that can be configured by the configurator, and returns the selected type of the application parameter to the configurator;

or, configured to receive a type of an application parameter, which is supported by the mobile terminal and sent by the mobile terminal, and determine, according to the type of the application parameter, which is supported by the mobile terminal, a type of an application parameter that needs to be configured by the mobile terminal.

The configurator in this embodiment of the present application may further include:

an obtaining unit 704, configured to obtain software platform information of the mobile terminal after the first negotiating module 7021 determines that there is no file type jointly supported by the configurator and the mobile terminal;

a first determining unit 705, configured to: determine whether the mobile terminal is a smart mobile terminal; and if the mobile terminal is not a smart mobile terminal, trigger the second sending module 7032; or if the mobile terminal is a smart mobile terminal, trigger a second determining unit 706;

the second determining unit 706, configured to: determine whether the configurator has an application program that is suitable for a software platform of the mobile terminal, where the application program is a program that can be run by the mobile terminal and can configure the foregoing application parameter automatically; and if the configurator has no application program that is suitable for the software platform of the mobile terminal, trigger the second sending module 7032; or if the configurator has an application program that is suitable for the software platform of the mobile terminal, trigger a second sending unit 707; and the second sending unit 707, configured to send the foregoing application program to the mobile terminal.

Specific interaction processes between units of the configurator in this embodiment of the present application are as follows:

When the mobile terminal approaches the configurator, the connecting unit 701 of the configurator establishes a NFC connection with the mobile terminal. If the configurator is an initiating device, the connecting unit 701 of the configurator sends a radio frequency signal to a surrounding area at regular time, and waits to see whether a response can be received from a peer mobile terminal; if a response can be received from the peer mobile terminal, the configurator identifies parameter information (including a device type and an implemented function) of the peer mobile terminal, and checks whether an NFC connection can be established. Meanwhile, the connecting unit 701 also sends related parameter information to the mobile terminal. After the mobile terminal and the configurator performs mutual authentication, an NFC connection can be established.

After the NFC connection is established, the negotiating unit 702 negotiates a configuration manner with the mobile terminal through the NFC connection. A process of negotiating a configuration manner is specifically as follows:

The second negotiating module 7022 negotiates, through the foregoing NFC connection, a type of an application parameter that needs to be configured with the mobile terminal. The negotiation may be as follows: The second negotiating module 7022 sends a function that can be implemented by the configurator to the mobile terminal, the mobile terminal intelligently identifies a function that can be implemented by the mobile terminal, and then the mobile terminal returns a type of an application parameter that can be configured (or need to be configured) by the mobile terminal; or the second negotiating module 7022 sends functions that can be implemented by the configurator to the mobile terminal in a list form, so that a user itself selects different types of application parameters for configuration; when the mobile terminal supports both OMA CP and DM, if the mobile terminal makes intelligent selection, the mobile terminal selects a type of an application parameter of an optimal function; and if the user itself makes selection, the user may select, according to its own need, a type of an application parameter that needs to be configured. In addition, the mobile terminal may also send a type of an application parameter, which can be supported by the mobile terminal, to the second negotiating module 7022 of the configurator, and the second negotiating module 7022 selects all types of application parameters, which can be supported by the mobile terminal. It is understandable that in an actual application, another implementation manner for the mobile terminal to negotiate the type of the application parameter with the configurator may also exist, which is not specifically limited herein.

After the negotiating the type of application parameter is completed, the first negotiating module 7021 negotiates with the configurator, through the foregoing NFC connection, whether there is a file type jointly supported by the configurator and the mobile terminal; if there is a file type jointly supported by the configurator and the mobile terminal, the first sending module 7031 is triggered; or if there is no file type jointly supported by the configurator and the mobile terminal, the second sending module 7032 is triggered. The file type refers to a file type that allows the mobile terminal to configure an application parameter automatically, and the file type may be a file type in various mobile phone systems. A process in which the first negotiating module 7021 negotiates with the mobile terminal the file type jointly supported by the configurator and the mobile terminal may be as follows: The first negotiating module 7021 sends, in sequence, a file type that can be supported by the configurator to the mobile terminal for identification; if the mobile terminal makes no response or returns a response message, which indicates that a file type cannot be supported, within a preset duration, it indicates that the mobile terminal cannot support the file type, and the first negotiating module 7021 continues to send another file type until the first negotiating module 7021 sends all file types that can be supported by the configurator completely; if there is still no file type jointly supported by the configurator and the mobile terminal (a file type that allows the mobile terminal to configure an application parameter automatically), the second sending module 7032 is triggered, so as to send an application parameter to the mobile terminal in a readable text format through the foregoing NFC connection; and if the mobile terminal can return a response message indicating that a file type is supported, the first sending module 7031 is triggered, so as to send a configuration file to the mobile terminal through the foregoing NFC connection, where the configuration file includes an application parameter.

The foregoing process of negotiating a file type may also be as follows: The first negotiating module 7021 sends various file types that can be supported by the configurator to the mobile terminal in a list form; and the mobile terminal intelligently identifies a file type or the user itself selects a file type. It is understandable that in an actual application, another implementation manner for the mobile terminal to negotiate with the configurator the file type jointly supported by the mobile terminal and the configurator may also exist, which is not specifically limited herein.

Optionally, if there is no file type jointly supported by the mobile terminal and the configurator, the obtaining unit 704 may further be triggered, so as to obtain software platform information provided by the mobile terminal, where the software platform information may be a system platform supported by the mobile terminal and a file type that can be installed on the system platform. After a software platform of the mobile terminal is obtained, the first determining unit 705 determines, according to the software platform information, whether the mobile terminal is a smart mobile terminal; and if the mobile terminal is not a smart mobile terminal, the second sending module 7032 is directly triggered; or if the mobile terminal is a smart mobile terminal, the second determining unit 706 is triggered. The foregoing smart mobile terminal is a mobile terminal whose function can be extended by installing a third-party application program.

After it is determined whether the mobile terminal is a smart mobile terminal, the second determining unit 706 determines, according to the software platform information, whether the configurator has a local application program that is suitable for the mobile terminal, where the application program is a program that can be run by the mobile terminal and can configure an application parameter automatically; and if there is no local application program that is suitable for the mobile terminal, the second sending module 7032 is triggered; or if there is a local application program that is suitable for the mobile terminal, the second sending unit 707 is triggered.

After it is determined that the configurator has an application program that is suitable for the mobile terminal, the second sending unit 707 sends, through the NFC connection, the application program that is suitable for the mobile terminal to the mobile terminal.

Optionally, the application program may carry a configuration file. In this way, after finishing installing the application program, the mobile terminal may set a related parameter immediately according to the configuration file; if the configurator does not carry a configuration file in the application program, the configurator may wait for a response, which indicates that the application program has been installed, from the mobile terminal; after receiving the response, the first sending module 7031 is triggered; or, when or after the application program is sent to the mobile terminal, the first sending module 7031 is triggered directly.

Figure 8:
FIG. 8 is a simplified block diagram of a system for configuring a parameter according to an embodiment of the present application.

An embodiment of a system for configuring a parameter according to the present application is described in the following, where the system is configured to execute the foregoing method for configuring an application parameter of a mobile terminal. Referring to a logical structure shown in FIG. 8, an embodiment of a system for configuring a parameter according to an embodiment of the present application includes:

a mobile terminal 801 and a configurator 802.

The mobile terminal 801 is configured to: establish an NFC connection with the configurator 802; negotiate a configuration manner with the configurator 802 through the NFC connection; and receive an application parameter sent by the configurator 802, where the application parameter is a parameter that is determined by the configurator according to a configuration manner negotiation result.

The configurator is configured to: establish the NFC connection with the mobile terminal 801; negotiate the configuration manner with the mobile terminal 801 through the NFC connection; and send the application parameter to the mobile terminal 801 according to the configuration manner negotiation result.

It can be clearly understood by persons skilled in the art that, for the purpose of convenient and brief description, for a detailed working process of the foregoing system, apparatus, and unit, reference may be made to the corresponding process in the method embodiments, and the details are not described herein again.

In the several embodiments provided in the present application, it should be understood that the disclosed system, apparatus, and method may be implemented in other manners. For example, the described apparatus embodiments are merely exemplary. For example, the unit division is merely logical function division and can be other division in actual implementation. For example, multiple units or components can be combined or integrated into another system, or some features can be ignored or are not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions of the embodiments.

In addition, functional units in the embodiments of the present application may be integrated into one processing unit, or each of the units may exist alone physically, or two or more units are integrated into one unit. The integrated unit may be implemented in the form of hardware, or may be implemented in the form of a software functional unit.

When being implemented in the form of a software functional unit and sold or used as a separate product, the integrated unit may be stored in a computer-readable storage medium. Based on such understanding, the technical solutions of the present application essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to execute all or a part of steps of the methods described in the embodiments of the present application. The storage medium includes: any medium that can store program codes, such as a U-disk, a removable hard disk, a read-only memory (ROM), a random access memory (RAM), a magnetic disk, or an optical disk.

The foregoing descriptions are merely exemplary embodiments of the present application, but are not intended to limit the protection scope of the present application. Any variation or replacement made by persons skilled in the art without departing from the technical scope disclosed in the present application shall all fall within the protection scope of the present application. Therefore, the protection scope of the present application shall be subject to that of the appended claims.

What is claimed is:

1. A method for configuring a mobile terminal, comprising:
   establishing, by a mobile terminal, a near field communication (NFC) connection with a configurator;
   negotiating, between the mobile terminal and the configurator, a file type for a configuration file generated by the configurator through the NFC connection, wherein the configuration file comprises a configuration parameter for configuring the mobile terminal;
   receiving, by the mobile terminal, from the configurator through the NFC connection, the configuration file having the negotiated file type; and
   performing, by the mobile terminal, a configuration based on the configuration parameter in the configuration file,
   wherein negotiating, between the mobile terminal and the configurator, the file type for the configuration file comprises:
   receiving, by the mobile terminal, the file type for the configuration file from the configurator; and identifying, by the mobile terminal the file type that allows the mobile terminal to execute the configuration file automatically.

2. The method according to claim 1, wherein when no file type that allows the mobile terminal to execute the configuration file automatically is identified, the method further comprising: sending software platform information of the mobile terminal to the configurator,
receiving from the configurator an application program corresponding to the software platform to be run by the mobile terminal,
installing the application program, and
receiving the configuration file from the configurator having the file type and to be executed by the application program automatically.

3. The method according to claim 2, wherein the configuration file is sent by the configurator separately from the application program; or the configuration file is extracted from the application program.

4. The method according to claim 1, before the receiving, by the mobile terminal, from the configurator through the NFC connection, the configuration file having the negotiated file type, the method further comprising:
receiving, by the mobile terminal, from the configurator a plurality of parameter types;
selecting, by the mobile terminal, a parameter type that is supported by the mobile terminal from the plurality of parameter types;
sending, by the mobile terminal, the selected parameter type to the configurator,
wherein the receiving, by the mobile terminal, from the configurator through the NFC connection, the configuration file having the negotiated file type comprises:
receiving, by the mobile terminal, the configuration file from the configurator that comprises the configuration parameter corresponding to the selected parameter type.

5. The method according to claim 1, wherein the receiving, by the mobile terminal, from the configurator through the NFC connection, the configuration file having the negotiated file type comprises:
when identifying the file type allowing the mobile terminal to execute the configuration file automatically, receiving the configuration file having the file type;
when identifying the file type not allowing the mobile terminal to execute the configuration file automatically, receiving the configuration file having a readable text format.

6. A mobile terminal, comprising:
a near field communication (NFC) transceiver and a processor,
wherein
the NFC transceiver is configured to establish an NFC connection with a configurator;
the processor is configured to negotiate with the configurator a file type for a configuration file generated by the configurator through the NFC connection, wherein the configuration file comprises a configuration parameter for configuring the mobile terminal;
receive the configuration file having the negotiated file type from the configurator through the NFC connection; and
perform a configuration based on the configuration parameter in the configuration file,
wherein in negotiating the file type for the configuration file, the processor is configured to:
receive the file type for the configuration file from the configurator; and
identify the file type that allows the configuration file to be executed automatically.

7. The mobile terminal according to claim 6,
wherein when no file type that allows the configuration file to be executed automatically is identified, the processor further configured to send software platform information of the mobile terminal to the configurator, receive from the configurator an application program to be run by the processor, install the application program, and receive a configuration file from the configurator having the file type and to be executed by the application program automatically.

8. The mobile terminal according to claim 7, wherein the configuration file is sent by the configurator separately from the application program; or the configuration file is extracted from the application program.

9. The mobile terminal according to claim 6, before receiving configuration file having the negotiated file type from the configurator through the NFC connection, the processor is further configured to:
obtain from the configurator a plurality of parameter types;
select a parameter type that is supported by the mobile terminal from the plurality of parameter types;
send the selected parameter type to the configurator through the NFC transceiver,
wherein in the receiving configuration file having the negotiated file type, the processor is configured to receive the configuration file from the configurator that comprises the configuration parameter corresponding to the selected parameter type.

10. A configuration device, comprising:
a near field communication (NFC) transceiver and a processor;
wherein
the NFC transceiver is configured to establish an NFC connection with a mobile terminal;
the processor is configured to negotiate with the mobile terminal a file type for a configuration file through the NFC connection, wherein the configuration file comprises a configuration parameter for configuring the mobile terminal; and
send the configuration file having the negotiated file type to the mobile terminal through the NFC connection,
wherein in negotiating the file type for the configuration file, the processor is configured to:
send the file type for the configuration file from the mobile terminal; and
receive a message indicating the file type that allows the mobile terminal to execute the configuration file automatically.

11. The device according to claim 10,
wherein when no file type that allows the mobile terminal to execute the configuration file automatically is identified, the processor further configured to receive software platform information of the mobile terminal, send an application program to be run by the mobile terminal, and send, to the mobile device, a configuration file having the file type and to be executed by the application program automatically.

12. The device according to claim 10, before sending configuration file having the negotiated file type to the mobile terminal through the NFC connection, the processor is further configured to:
send to the mobile terminal a plurality of parameter, and receive from the mobile terminal a selected parameter type;

wherein in the sending configuration file having the negotiated file type, the processor is configured to send the configuration file that comprises the configuration parameter corresponding to the selected parameter type.

13. A method for configuring an application parameter of a mobile terminal, comprising:

establishing, by a configuration device, a near field communication (NFC) connection with the mobile terminal;

negotiating, between the configuration device and the mobile terminal, a file type for a configuration file generated by the configurator through the NFC connection, wherein the configuration file comprises a configuration parameter for configuring the mobile terminal; and sending, by the configuration device, the configuration file having the negotiated file type to the mobile terminal through the NFC connection, wherein negotiating, between the mobile terminal and the configuration device, the file type for the configuration file comprises:

sending, by the configuration device, the file type for the configuration file; and receiving, by configuration device, a message indicating the file type that allows the mobile terminal to execute the configuration file automatically.

* * * * *